US011131385B2

(12) United States Patent
Zitting et al.

(10) Patent No.: US 11,131,385 B2
(45) Date of Patent: Sep. 28, 2021

(54) PRESS-IN RETAINER RING

(71) Applicants: Thomas Paul Zitting, Salt Lake City, UT (US); Daniel K. Zitting, St. George, UT (US)

(72) Inventors: Thomas Paul Zitting, Salt Lake City, UT (US); Daniel K. Zitting, St. George, UT (US)

(73) Assignee: Atlas Seals, Inc., Salt Lake City, UT (US)

(*) Notice: Subject to any disclaimer, the term of this patent is extended or adjusted under 35 U.S.C. 154(b) by 77 days.

(21) Appl. No.: 16/164,646

(22) Filed: Oct. 18, 2018

(65) Prior Publication Data

US 2019/0113141 A1  Apr. 18, 2019

Related U.S. Application Data

(60) Provisional application No. 62/573,961, filed on Oct. 18, 2017.

(51) Int. Cl.
*F16J 15/3268* (2016.01)
*F16J 15/3248* (2016.01)
*F16J 15/3276* (2016.01)
*F16J 15/3252* (2016.01)

(52) U.S. Cl.
CPC ....... *F16J 15/3268* (2013.01); *F16J 15/3248* (2013.01); *F16J 15/3252* (2013.01); *F16J 15/3276* (2013.01)

(58) Field of Classification Search
CPC .. F16J 15/3216; F16J 15/3248; F16J 15/3252; F16J 15/3268; F16J 15/3276
See application file for complete search history.

(56) References Cited

U.S. PATENT DOCUMENTS

| | | | |
|---|---|---|---|
| 2,587,405 A | 2/1952 | Stevens et al. | |
| 2,833,577 A * | 5/1958 | Reynolds | F16J 15/3232 277/550 |
| 2,926,938 A * | 3/1960 | Ratti | F16J 15/3268 277/576 |
| 2,977,139 A * | 3/1961 | Primeau | F16J 15/3248 277/572 |
| 4,544,168 A * | 10/1985 | Hans | F16C 33/7876 277/353 |
| 4,623,153 A | 11/1986 | Nagasawa | |
| 5,163,692 A | 11/1992 | Schofield et al. | |
| 5,245,741 A * | 9/1993 | Smith | F16J 15/3252 264/163 |
| 5,603,532 A | 2/1997 | Guest | |
| 5,984,316 A * | 11/1999 | Balsells | F16J 15/3212 277/553 |
| 6,557,857 B1 * | 5/2003 | Goodman | F16J 15/3224 277/549 |
| 6,648,336 B1 * | 11/2003 | Kostrzewsky | F16C 17/10 277/549 |

(Continued)

*Primary Examiner* — Nicholas L Foster
(74) *Attorney, Agent, or Firm* — Gurr Brande & Spendlove, PLLC; Robert A. Gurr

(57) ABSTRACT

A continuous length of formed metal retaining material can be cut to the partial or full circumference or perimeter of at least one assembly component and disposed in a groove of at least one assembly component to form a retaining ring engaging at least one other assembly component. The retaining ring prohibits lateral and rotational movement.

10 Claims, 19 Drawing Sheets

(56) References Cited

U.S. PATENT DOCUMENTS

| | | | |
|---|---|---|---|
| 7,147,229 B2* | 12/2006 | Madigan | F16J 15/3252 |
| | | | 277/551 |
| 2005/0200082 A1* | 9/2005 | Madigan | F16J 15/3268 |
| | | | 277/549 |
| 2010/0194104 A1 | 8/2010 | Hennemann et al. | |
| 2018/0023708 A1* | 1/2018 | Pfandl | F16J 15/3272 |
| | | | 277/382 |

* cited by examiner

PRESS-IN RETAINER RING

CROSS-REFERENCE TO RELATED APPLICATIONS

This application claims the benefit of U.S. Provisional Application Ser. No. 62/573,961, filed on Oct. 18, 2017, which is incorporated herein by reference.

TECHNICAL FIELD

The present disclosure relates to assembly and fastening of mechanical components. More particularly, the present disclosure relates to rings which aid the retention of components assembled by sliding or pressing one inside another.

BACKGROUND

The use of retaining devices is common in the broad field of assembled mechanical components. Many assemblies require one component to be assembled into another and are then retained in place with the aid of a ring which is press-fitted with interference or placed partially in a groove in a component. Standard press-in retainer rings are produced in the size and shape of one such component. However, this requires a unique size or shape to be produced and stocked, ready for each size or shape of article to be assembled. This poses challenges when making assemblies of many sizes or in small production runs or those that are customized with short lead-time requirements. The retaining rings must be sourced or produced before each variant of assembly can be assembled.

Another challenge is posed when the assembled components are cylindrical and assembled coaxially and must be retained, preventing relative rotating motion as well as being retained axially. For example, rotating shaft seals assembled into a cylindrical housing need to be retained axially to prevent rotation in the housing by resisting the friction torque of the seal's intended relatively rotating contact with another component's shaft, bore, or face surface. The unintended rotation (known as "counter-rotation") between the seal and the housing can cause a myriad of seal performance problems well known in the art, such as leakage, wear, or vibration.

Attempts have been made to retain mechanical components, such as seals, by use of retaining rings. For example, U.S. Pat. No. 2,587,405 discloses retained seals including the use of the aforementioned standard retaining rings of metal (for example, see FIGS. 7-10 of the '405 patent). However, this configuration would require retaining rings for each size of seal housing. Furthermore, these retaining rings would not prevent counter-rotation between the seal and housing unless the retaining ring is affixed to the seal. The act of affixing these parts together (e.g., by bonding) may require additional process steps or parts, which is undesirable.

Another approach to prevent seals from rotating relative to the housings is to provide a groove in a surface of the seal and a relatively soft static seal (e.g., rubber O-ring) disposed in that groove and deformed by assembly of the components to provide friction, resisting relative rotary-motion between the seal and housing. However, this friction is limited and affected by lubricating media in the application, and therefore not adequate in many applications to retain the seal rotationally or axially.

Another retaining approach for seals uses rigid metal rings assembled into the seal by insert molding or subsequent deformation (e.g., U.S. Pat. No. 4,664,392). These rings provide hoop stress to achieve a press-fit for axial and rotational retention, and are affixed to the sealing parts. However, these rings add complexity to the design and process of producing the seal, and must be sized for each housing or seal size. Furthermore, the force needed to press-fit seals with these metal rings may require additional tools.

Therefore, despite attempts in the prior art, there remains a need for a retaining ring which is simply assembled onto seals or other mechanical components, allows assembly of these items by minimal force, can retain the component axially and resist rotation, and does not need to be produced or stocked in unique sizes and shapes for each size or shape of assembled component.

SUMMARY OF EXAMPLE EMBODIMENTS

In one embodiment, a continuous length of formed metal retaining material can be cut to the partial, or full, circumference or perimeter of at least one assembly component and disposed in a groove of at least one assembly component to form a retaining member (e.g., ring) engaging at least one other assembly component.

In one embodiment, the continuous length of formed metal retaining material is comprised of repeating tabs attached together allowing flexibility to conform to various sizes and shapes. These tabs may be bent to provide an angular contact with the bore of an assembly component and allow assembly in one direction, then resist motion in the opposite direction (e.g., the ends of the tabs engaging the surface of the bore). Furthermore, the repeating tabs prevent rotation between the assembly components as they attempt to rock in response to rotational torque.

In one embodiment, the full or partial ring formed from the retaining material may be retained in the groove in at least one assembly component (referred to as the "first component") prior to assembly into or onto the at least one other assembly component (the "second component"). This retention in the groove may be accomplished by interference fit into the groove, or by adding retaining geometry to the groove itself.

In one embodiment, the length of repeating tabs used for retaining material to be formed into retaining members (e.g., rings) is of similar configuration to standard cantilever v-springs or cantilever u-springs used to provide sealing force to sealing lips for seal designs and materials well known in the art. Such springs are commercially available and produced by multiple suppliers such as Maudlin Products of Kemah, Tex. Therefore, they are readily available to, and often stocked by, manufacturers of seals and convenient to repurpose for use as a retaining ring material.

In one embodiment, a support member may be coupled to the first component, adding structural integrity (e.g., hoop strength) to the first component. In other words, the first component may be subject to deformation when inserted into a bore of an assembly component (referred to as the "second component"). It may be further subject to deformation as various components of the assembly are subjected to torque. To counteract the torque and reduce or prevent deformation of the first component, a rigid support member is coupled thereto. In one embodiment, the rigid support member is received within a support channel of the first component.

In one embodiment, the first component may further comprise a seal lip for engaging a shaft, rod, or other assembly component (referred to as the "third component")

passing through the center of the first component. This third component often has motion relative to the second component. Thus, the first component serves as a dynamic seal, preventing the transfer of fluids or solid particles through the space between the first and third components.

DETAILED DESCRIPTION OF EXAMPLE EMBODIMENTS

Figure 1:
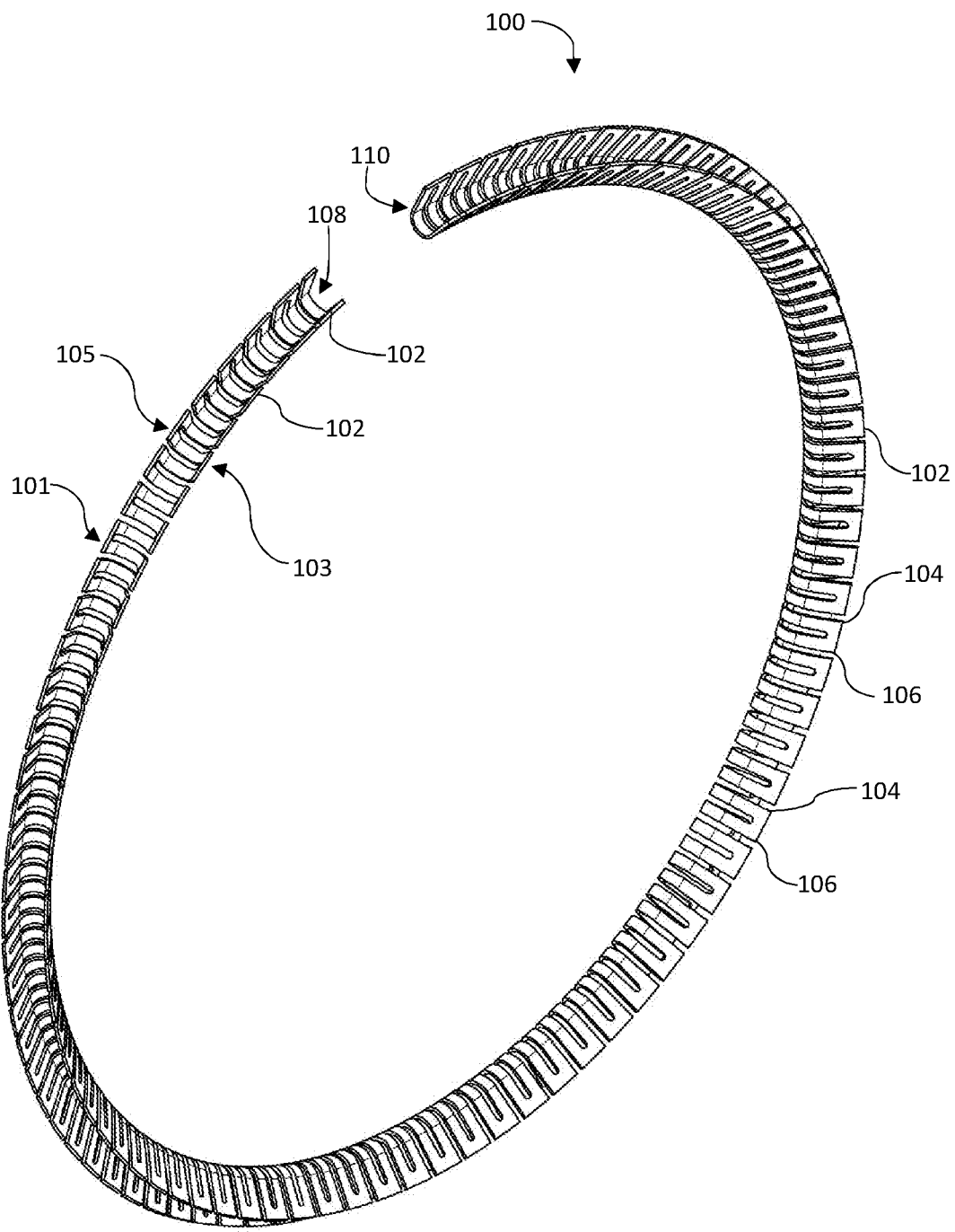
FIG. 1 is a perspective view of a retaining member in a circular configuration formed from bending strip material.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a retaining ring which is simply assembled onto seals or other mechanical components, that provides for assembly of these items by minimal force, which can retain the component axially and resist rotation, and which does not need to be produced or stocked in unique sizes and shapes for each size or shape of assembled component. The retaining ring disclosed herein solves these needs and others.

In one embodiment, as shown in FIG. 1, retaining member 100 is formed from a strip of material 101, which is bent to the shape of the first component (e.g., ring, square, etc.) and extending at least a portion of the circumference of the first component. In one embodiment the strip of material 101 is comprised of repeating, connected tabs 102 allowing the strip of material 101 to flex and twist easily, and providing multiple tab corners 104 and 106 to engage the assembly components and resist rotation between assembly components. The opposing ends 108, 110 of strip material 101 may be fastened or secured to one another forming a continuous shape. Accordingly, the retaining member 100 may be cut to length, the ends fastened together to make a closed perimeter, and then coupled to the first component (as discussed in later embodiments). In another embodiment, the retaining member 100 may be cut to the desired length, coupled to the first component, and then be fastened at its ends.

Figure 2:
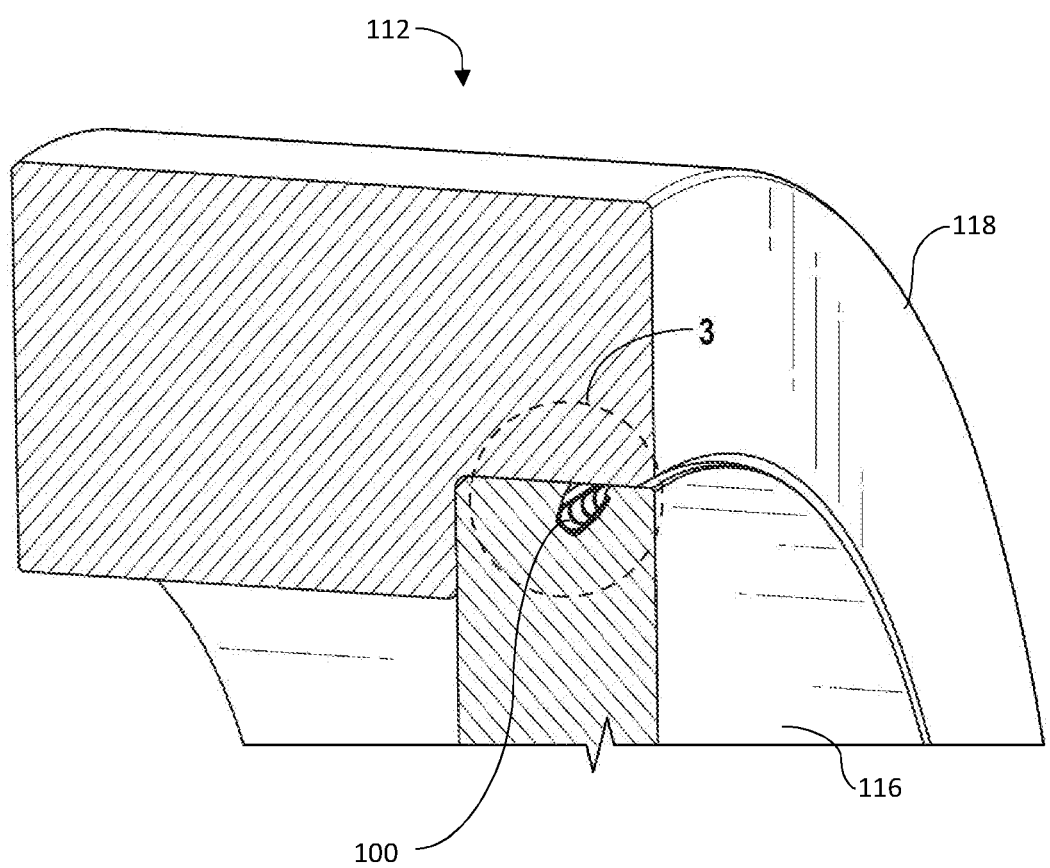
FIG. 2 is a detailed cross-section of a retaining assembly.
Figure 3:
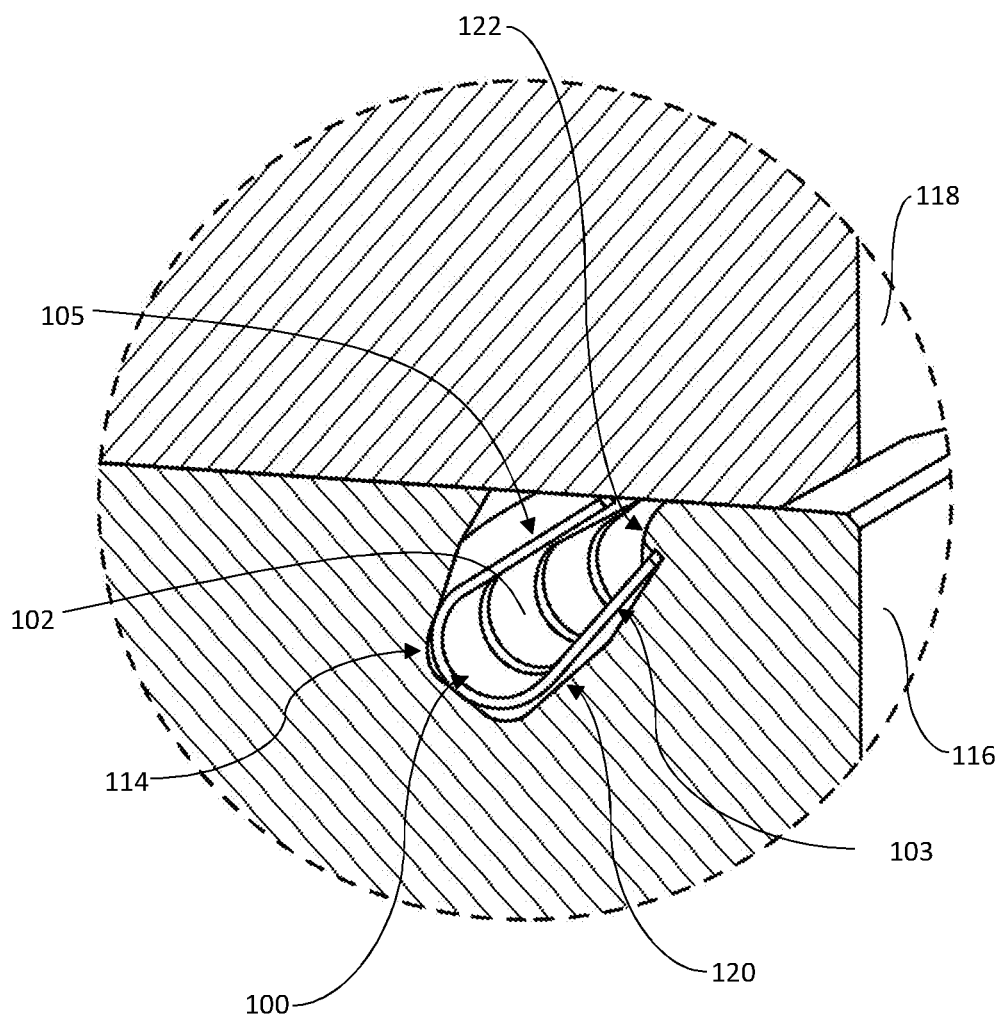
FIG. 3 is an enlarged view of FIG. 2 at 3.

FIGS. 2-3 illustrate how the strip material 101 forming the retaining member 100 of FIG. 1 is used to retain components in a retaining assembly 112. As shown, the retaining member 100 is disposed within a groove 114 of the first component 116. As the first component 116 is forced into the bore of a housing or component 118 (referred to as the "second component"), the tabs 102 bend in a first direction. Accordingly, if pressure or force is applied to the opposite side of the first component 116 (i.e., withdrawing from the second component 118 opposite the direction of entry), the tabs 102 are forced into the surface of the second component 118. As a result, the retaining member 100 restricts or prohibits the withdrawing of the first component 116 from within the second component 118. The groove 114 may include angled faces 120 to tilt the retaining member 100, allowing the tabs 102 to contact the second component 118 at a desired angle such that the retaining member 100 may flex to allow ease of assembly. The groove 114 may also have a retaining lip 122 to capture the retaining member 100 in the proper orientation, and to keep the retaining member 100 in groove 114 prior to installing first component 116 into second component 118. Stated another way, the retaining member 100 has a first portion 103 for abutting the first component 116 and a second portion 105 (comprising tabs 102) for abutting the second component 118. As illustrated in FIG. 1, the first portion 103 and second portion 105 form a "U" form factor. As further shown, both the first portion 103 and second portion 105 may be comprised of tabs 102, although it is not required, as shown in later embodiments herein.

Figure 4:
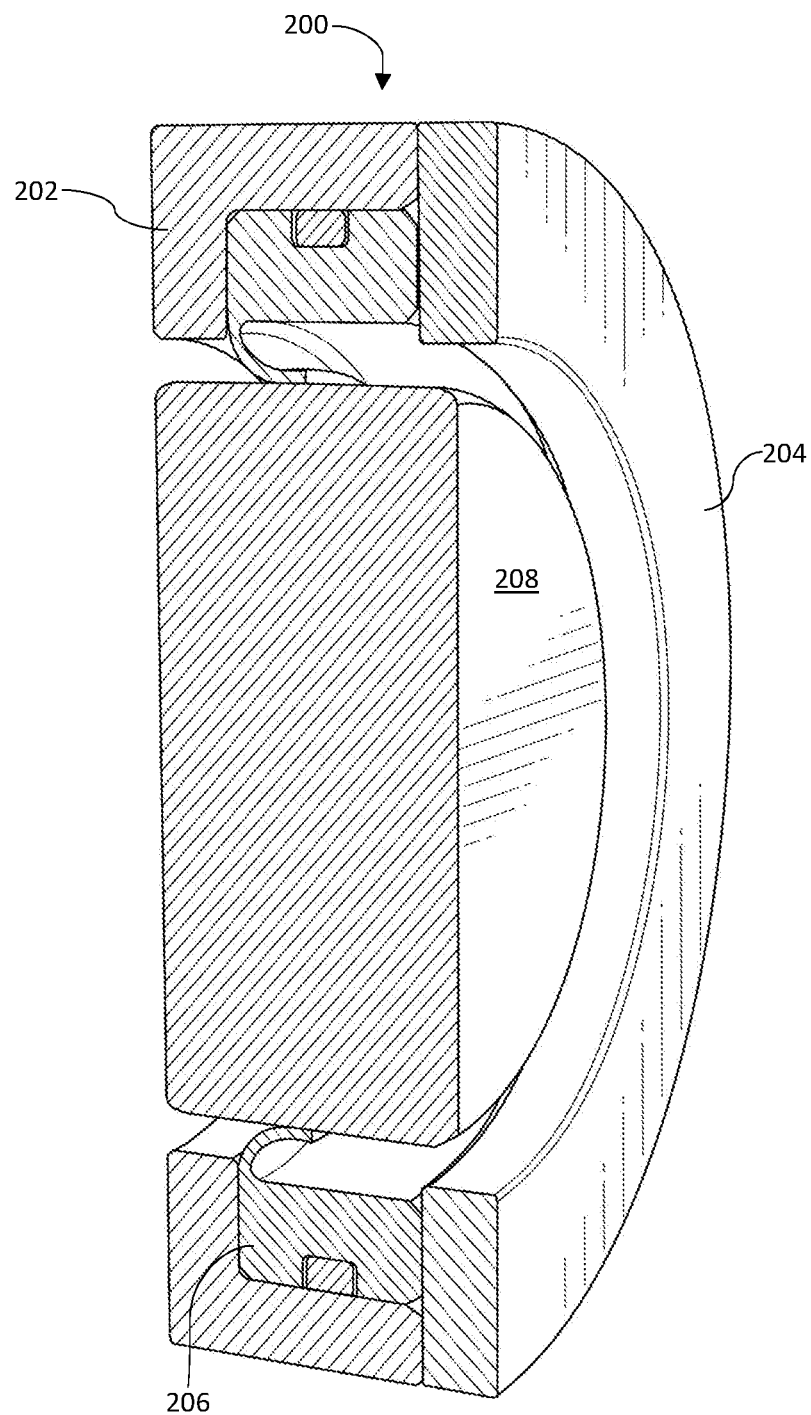
FIG. 4 is a cross-section of a prior art seal assembly.

It will be appreciated that any number of configurations of the present invention are possible, and that the retaining "ring" can be utilized for many shapes, sizes, configurations and applications. One exemplary application where such a retaining ring may be particularly useful is in seal assemblies. FIG. 4 shows a sectional view (half) of a typical seal assembly 200 of the prior art. The assembly 200 comprises an outer housing 202 and retainer plate 204 containing a static seal member 206. Shaft 208 may rotate, oscillate, or reciprocate with respect to the outer housing 202. Friction between static seal member 206 and shaft 208 could cause unintended rotation between the static seal member 206 and the outer housing 202 (known as "counter-rotation") resulting in seal performance problems well known in the art, such as leakage, wear, or vibration. Accordingly, the retaining member 100 disclosed in FIGS. 1-3 solves these problems.

Figure 5:
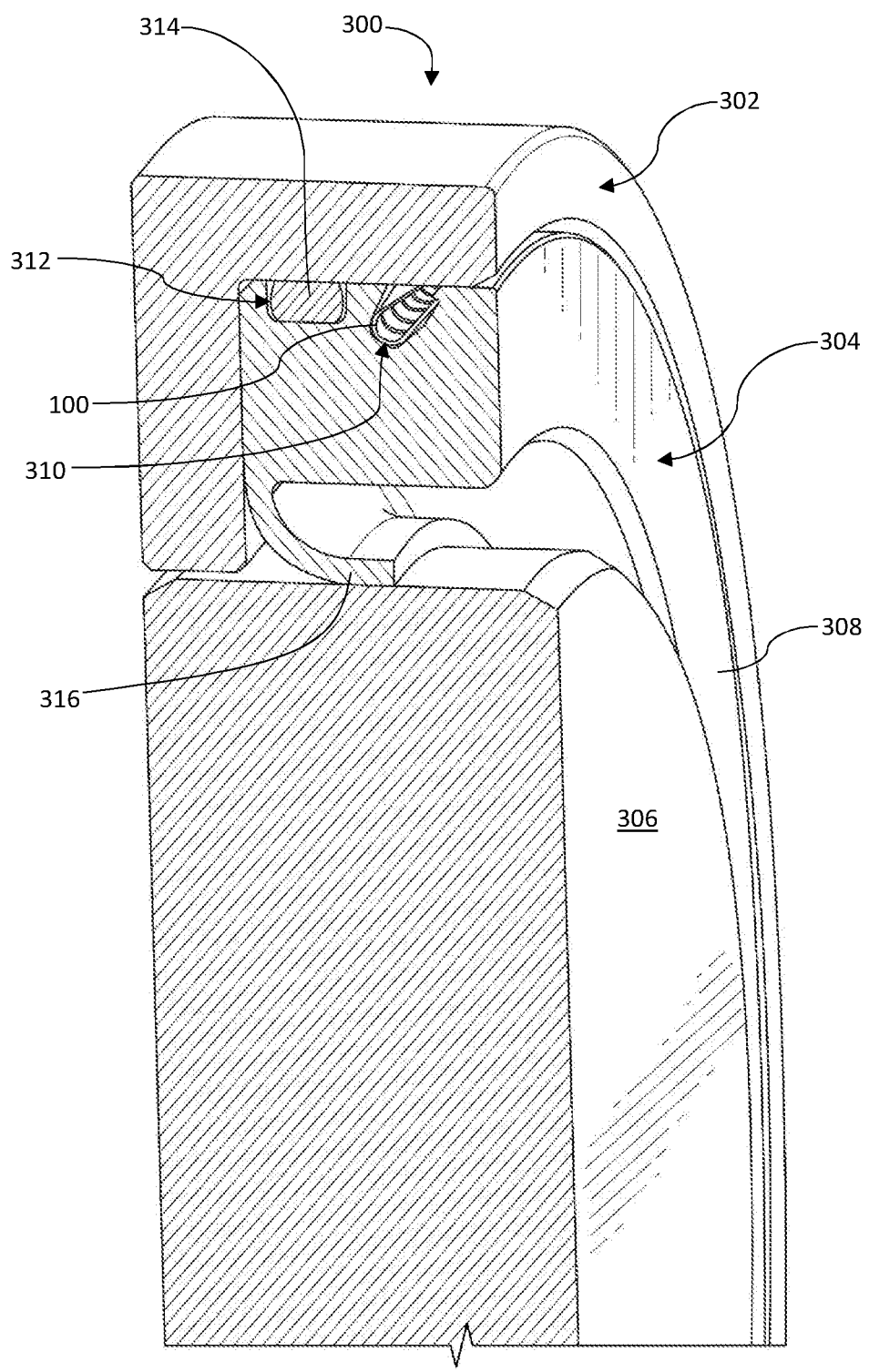
FIG. 5 is a detailed cross-section of a retaining assembly comprising a flexible static seal and a retaining member.

FIG. 5 is a detailed cross-section illustrating about one-quarter of a ring of a retaining assembly 300. The retaining assembly 300 comprises an outer housing 302 (the "second component"), a first component 304 (which functions as a dynamic seal in this example), and a third component 306 (shaft, rod, etc.). The first component 304 comprises a body 308 having a groove 310 for receiving the retaining member 100. The first component 304 may further comprise a seal groove 312 for static seal 314, and a seal lip 316 for engaging the third component 306. Due to the retaining member 100 engaging the inner surface of the outer housing 302, the first component 304 remains stationary, eliminating the need for the retaining plate 204 of FIG. 4 of the prior art. Because the retaining member 100 comprises a plurality of tabs 102, rotational movement of the first component 304 within the outer housing 302 is reduced or eliminated, saving space and cost of the assembly 300.

Figure 6:
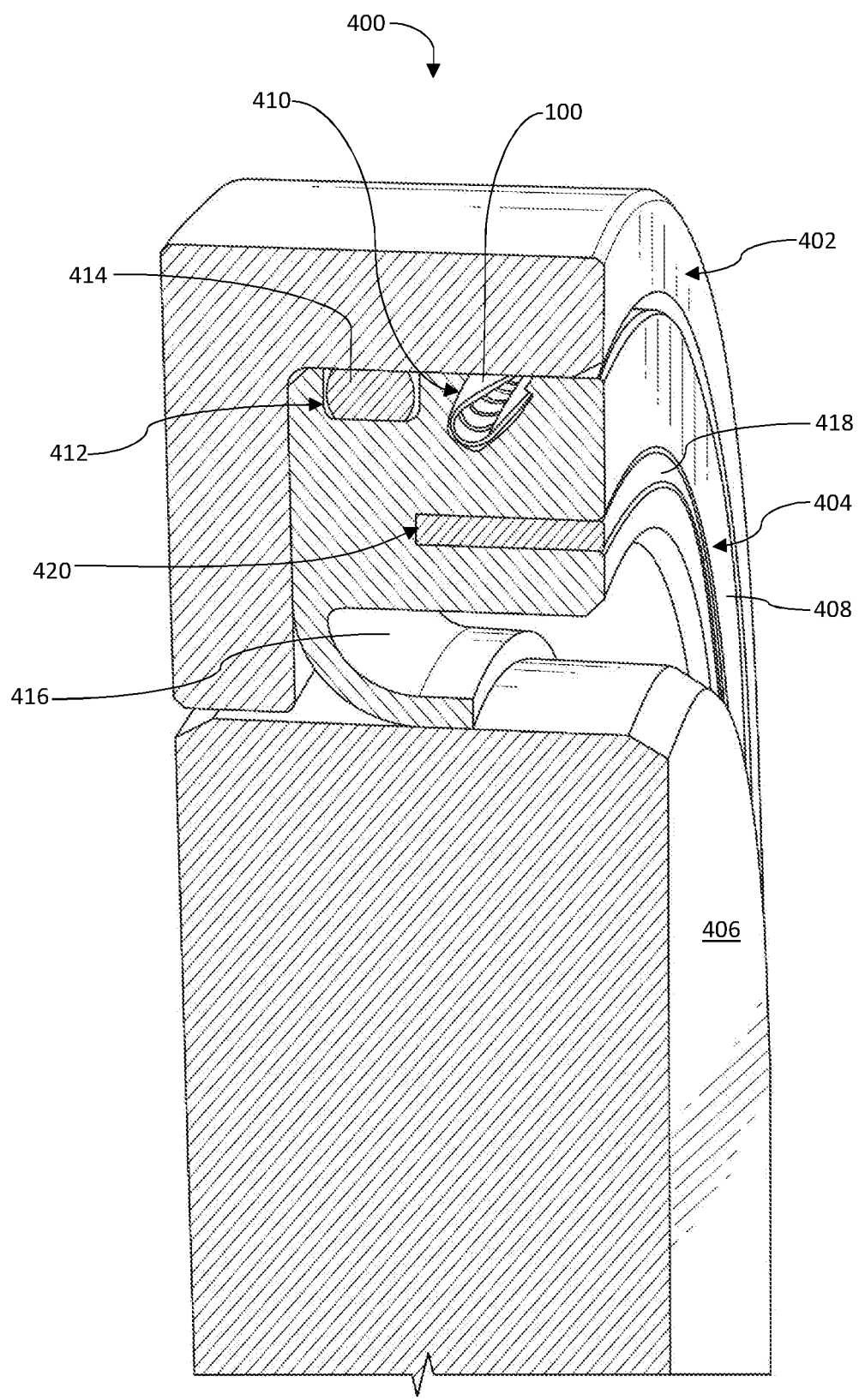
FIG. 6 is a detailed cross-section of a retaining assembly comprising a flexible static seal, a retaining member, and a support member.

In one embodiment, as shown in FIG. 6, the sealing assembly 400 includes an outer housing 402 (the "second component"), a first component 404, and a shaft or rod 406 ("third component"). The first component 404 (a dynamic seal in this example) comprises a body 408 having a groove 410 for receiving the retaining member 100. The first component 404 may further comprise a seal groove 412 for static seal 414, a seal lip 416 for engaging the rod 406, and a rigid support member 418 disposed in a channel 420. The shaft/rod 406 may be relatively moveable in assembly 400, while the first component remains stationary. The support member 418 is preferably rigid (e.g., comprises a metal or rigid plastic) and is added to provide additional hoop strength (i.e., structural integrity) to the first component 404. Support members (often referred to as "support rings") are well known in the art for applications with pressures, forces, or temperatures which might deform the relatively softer material (e.g., PTFE, rubber, or flexible polyurethane) of body 408. The support member 418 may be particularly advantageous in combination with retaining member 100, as the additional hoop strength would help prevent force from the retaining member 100 from deforming the body 408.

Figure 7:
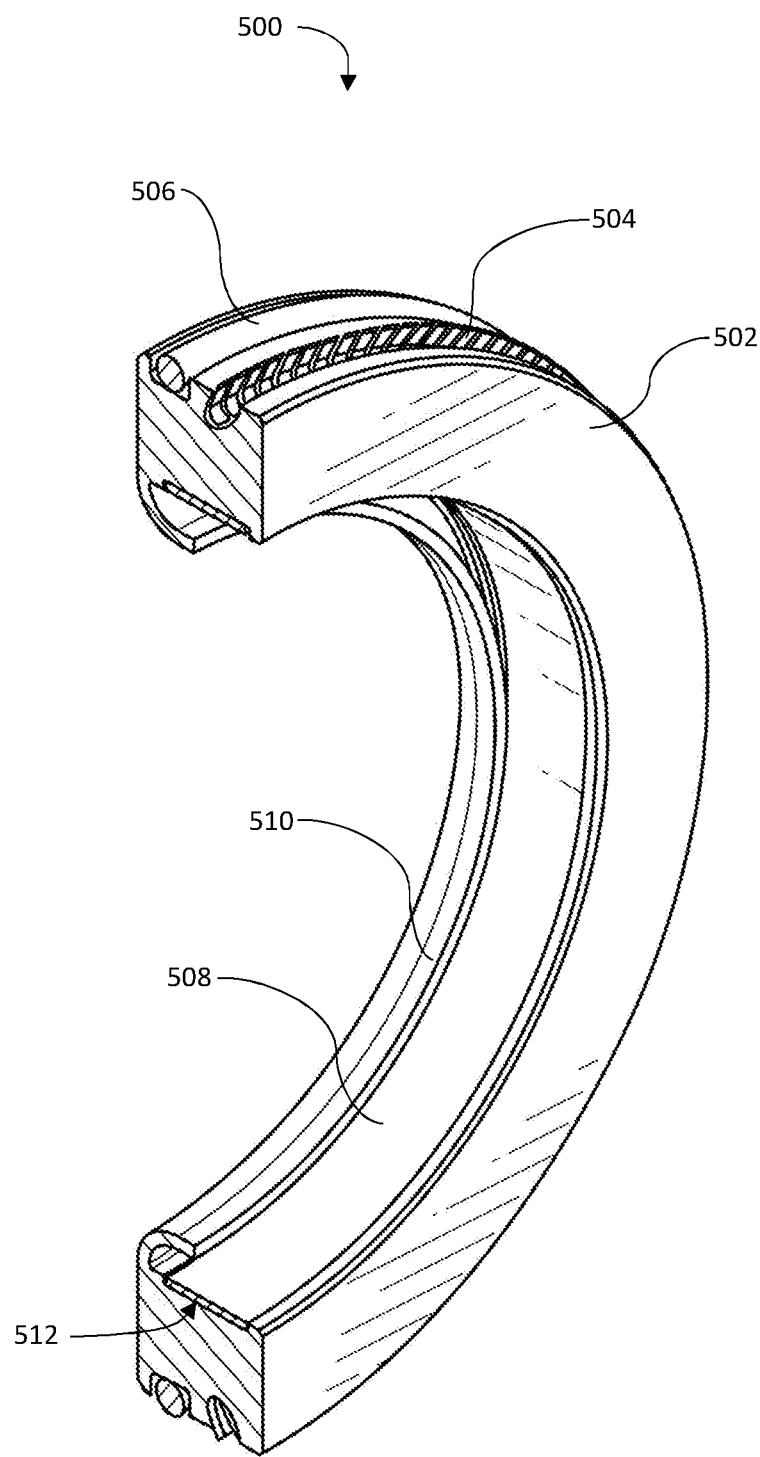
FIG. 7 is a cross-sectional perspective view of a first component comprising a retaining member, flexible static seal, and support member.
Figure 8:
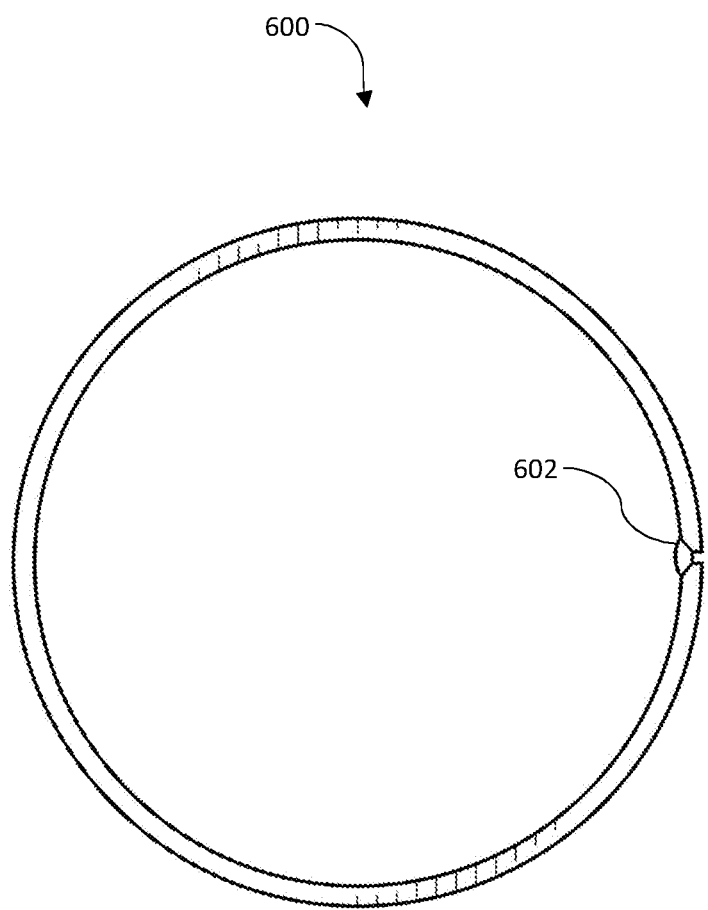
FIG. 8 is a front elevation view of a support member.
Figure 9:
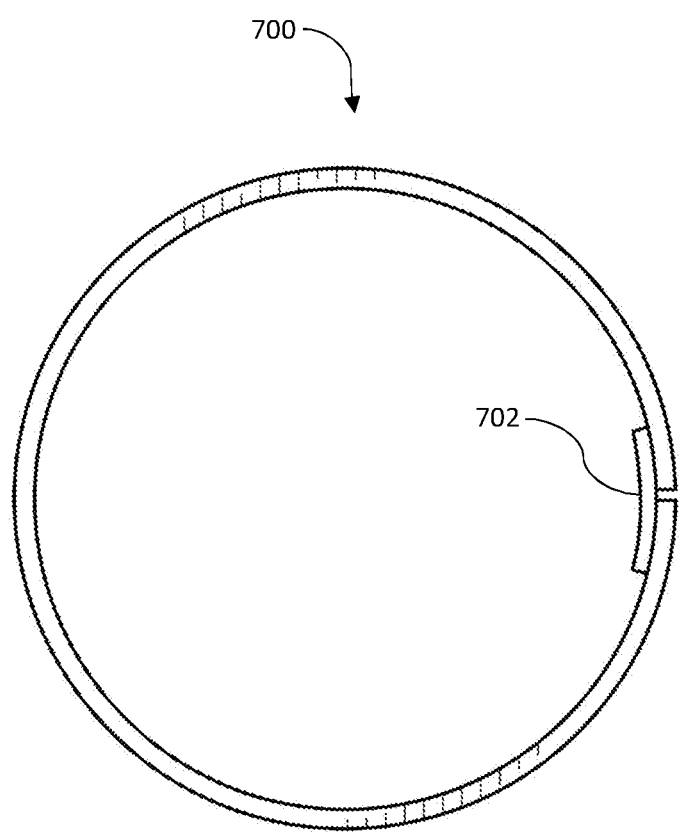
FIG. 9 is a front elevation view of a support member.
Figure 10:
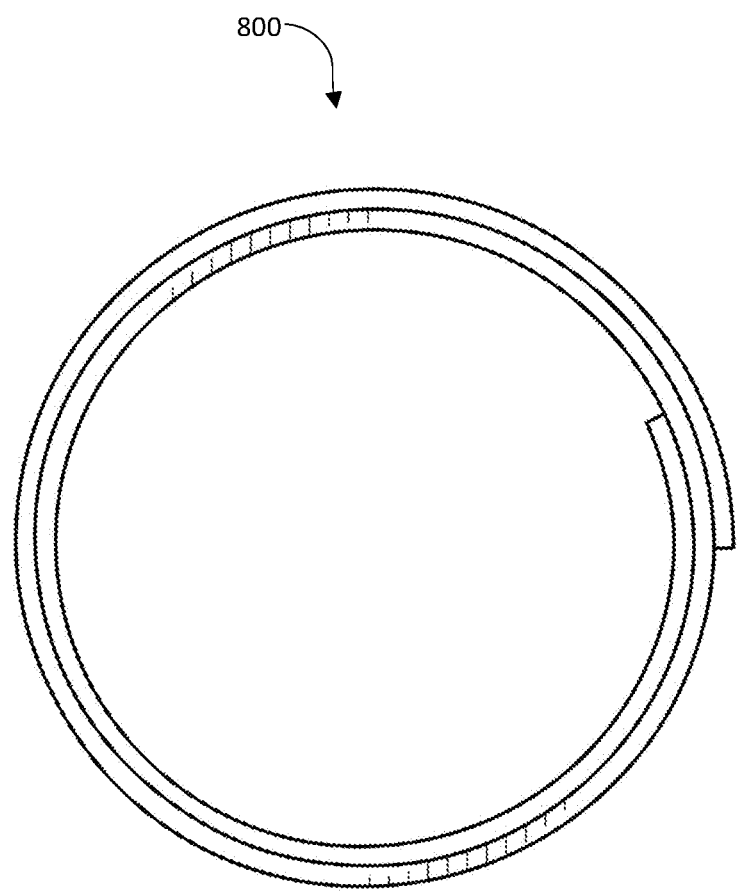
FIG. 10 is a front elevation view of a support member.

FIG. 7 illustrates a cross-section through the middle (i.e., half the ring is shown) of a ring configuration of a first component 500, the opposite side of the ring being a mirror image. The first component 500 comprises a body 502, a retaining member 504, a static seal 506, and a support member 508. As shown, the support member 508 is received under the seal lip 510 and may be secured in a channel 512 of the body 502. In this configuration, the support member 508 may be easily added to the first component 500. As shown in FIGS. 8-10, the support members may be formed from linear strip material. For example, FIG. 8 illustrates support member 600 with a spot weld 602. FIG. 9 illustrates a support ring 700 with a buckle strip that can be welded or otherwise adhered. FIG. 10 illustrates a support ring 800 that is formed into a spiral ring, which may provide support by rigidity of the material itself (for example, spring steel) or may be spot welded or otherwise adhered between the spiral layers to provide hoop strength. The benefit of forming the support members 600, 700, 800 from linear strip material is the ability to form various sizes of rings (i.e., lesser/greater diameter). This allows a user to easily adapt to the needs of the project quickly and easily, without the need to stock various sizes at all times.

Figure 11:
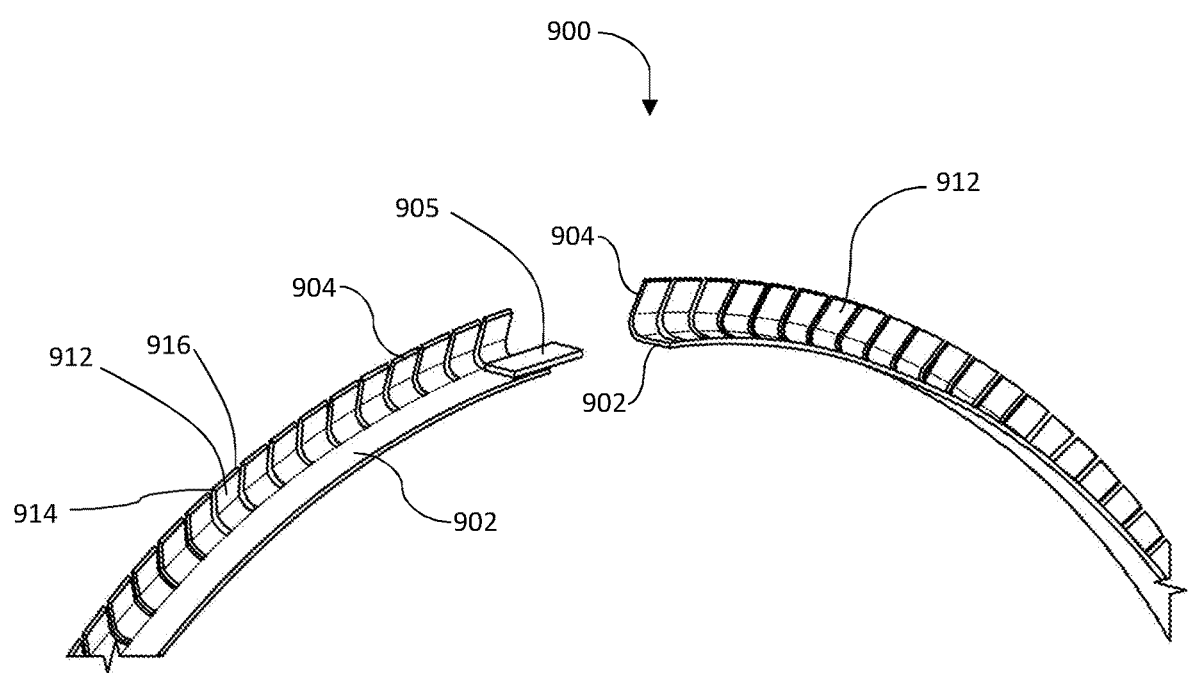
FIG. 11 is a detailed view of two ends of one piece of strip material prior to being secured.

FIG. 11 illustrates a partial view of a retaining member 900 in a different form factor from that of FIG. 1. In particular, rather than a "U" shape (as shown in FIG. 1), the form factor of retaining member 900 approximates an "L" shape, having horizontal portion 902 (the "first portion") and vertical portion 904 (the "second portion"). The ends of the retaining member 900 may be secured in the same manner as that disclosed for the support member of FIGS. 8-10. As shown, FIG. 11 has a buckle 905 that can be welded or adhered to the horizontal portions 904.

Figure 12:
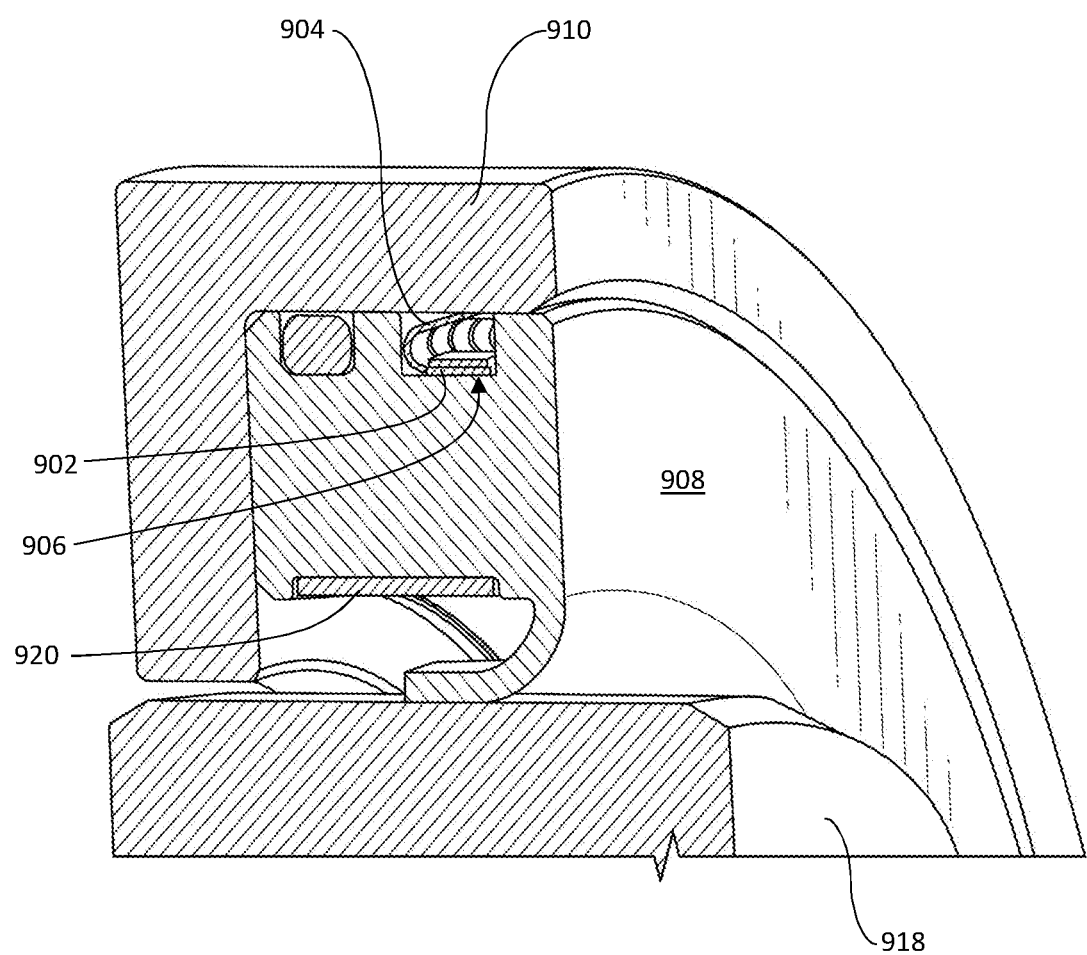
FIG. 12 is a detailed cross-section of a retaining assembly.
Figure 13:
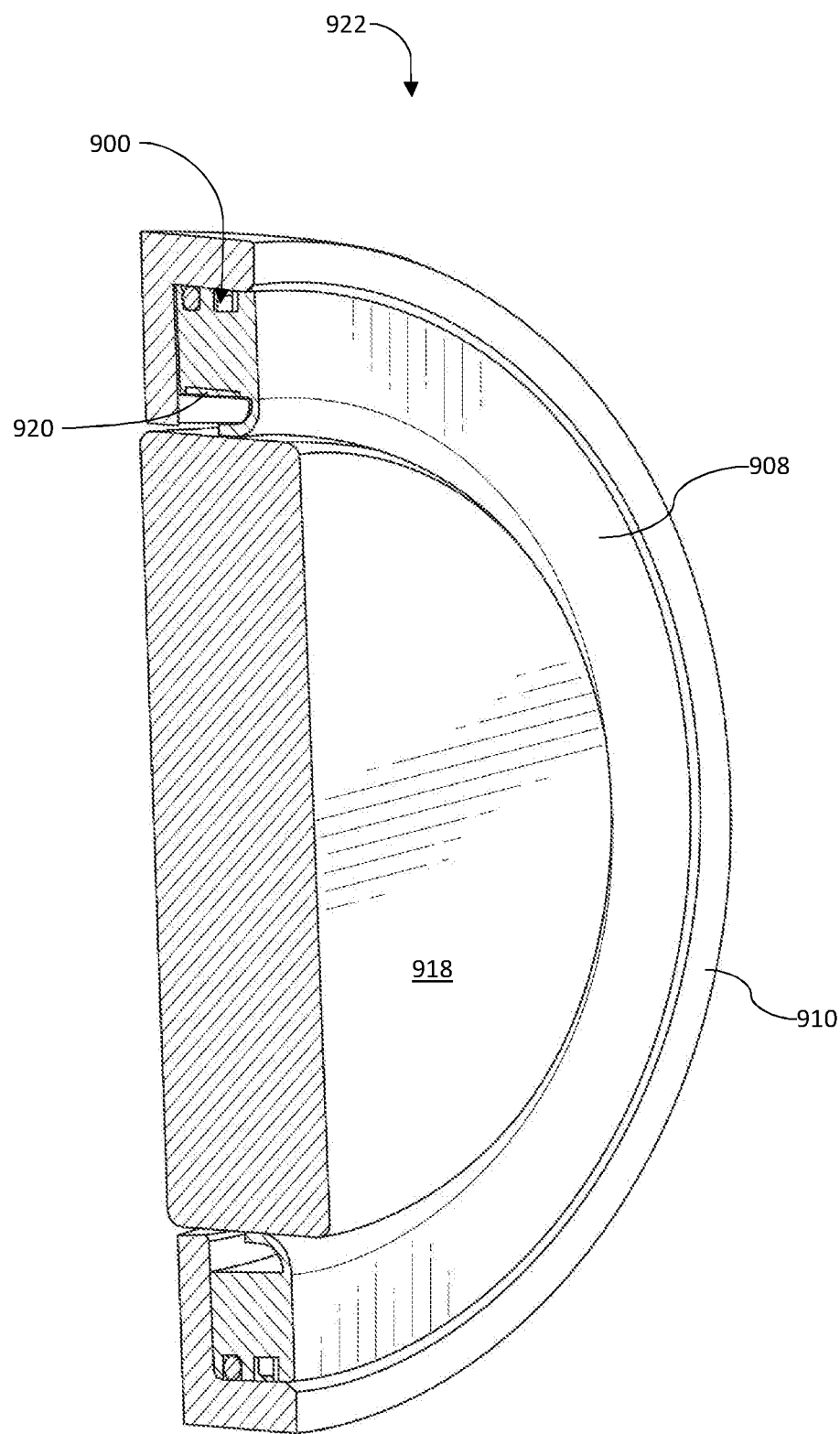
FIG. 13 is a cross section of a retaining assembly.

As shown in FIGS. 12-13, the horizontal portion 902 engages (e.g., abuts) the bottom of groove 906 of first component 908, the horizontal portion 902 being parallel to the surface of the first component 908. As the first component 908 is inserted into outer housing 910 (the "second component"), the vertical portion 904 (non-parallel to the surface of the first component 908) comes into contact with the outer housing 910 and the vertical portion 904 bends in response. This allows the first component 908 to be easily inserted into the bore of outer housing 910. However, when attempting to withdraw the first component 908 from within the bore of outer housing 910, the vertical portion 904 of the retaining member 900 engages (e.g., abuts/digs into the surface) the bore surface of outer housing 910, preventing withdrawal of the first component 908. Further, as shown in FIG. 11, the vertical portion 904 may comprise a plurality of tabs 912. Each tab 912 has corners 914, 916 which aid in prohibiting rotational movement of the first component 908. In other words, when a rotational torque is applied to third component 918 (e.g., a rod), the first component 908 may have a tendency to rotate as well. However, the corners 914 dig into the bore surface of the outer housing 910 when rotating in a first direction, and corners 916 dig into the bore surface of the outer housing 910 when rotating in a second direction. As the corners 914, 916 abut/dig in, the first component 908 is prohibited from rotating within the outer housing 910. A support member 920 (e.g., rigid metal or plastic hoop) may provide structural strength and support to the ring-shaped first component 908 as well. It will be appreciated that FIG. 13 illustrates half of the ring-shaped assembly 922, and that the non-visible half is a mirror image of that shown.

Figure 14:
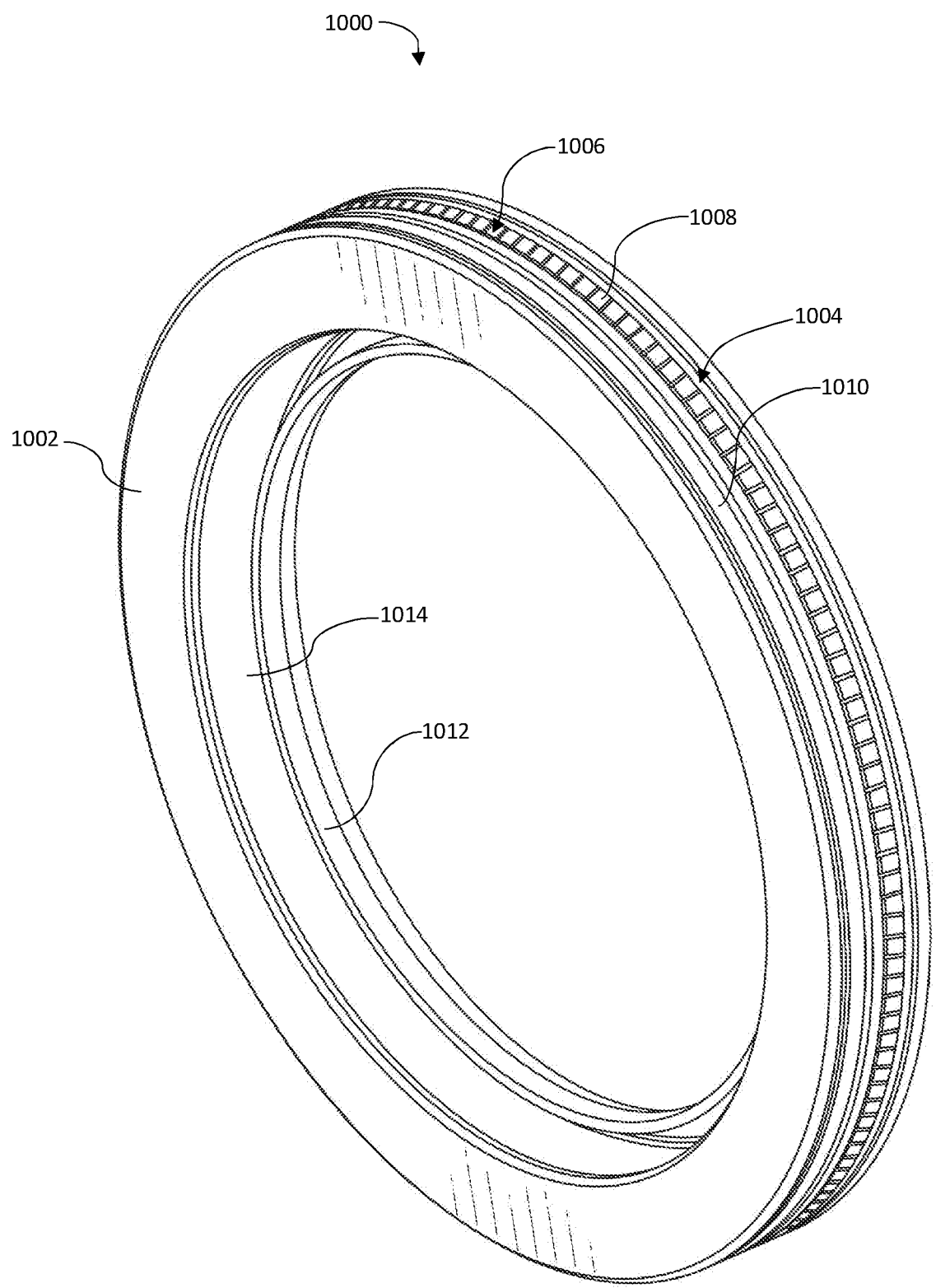
FIG. 14 is a perspective view of a first component.

FIG. 14 is a perspective view of a first component 1000. The first component 1000 comprises a body 1002, a groove 1004 in the body 1002 for receiving a retaining member 1006. The retaining member 1006 may further comprise tabs 1008. The first component 1000 may further comprise a static seal 1010, a seal lip 1012, and a support member 1014. At least a portion of the retaining member 1006 extends outside of the groove 1004 to engage a second component (not shown in this view) while the seal lip 1012 engages a shaft or rod (not shown in this view).

Figure 15:
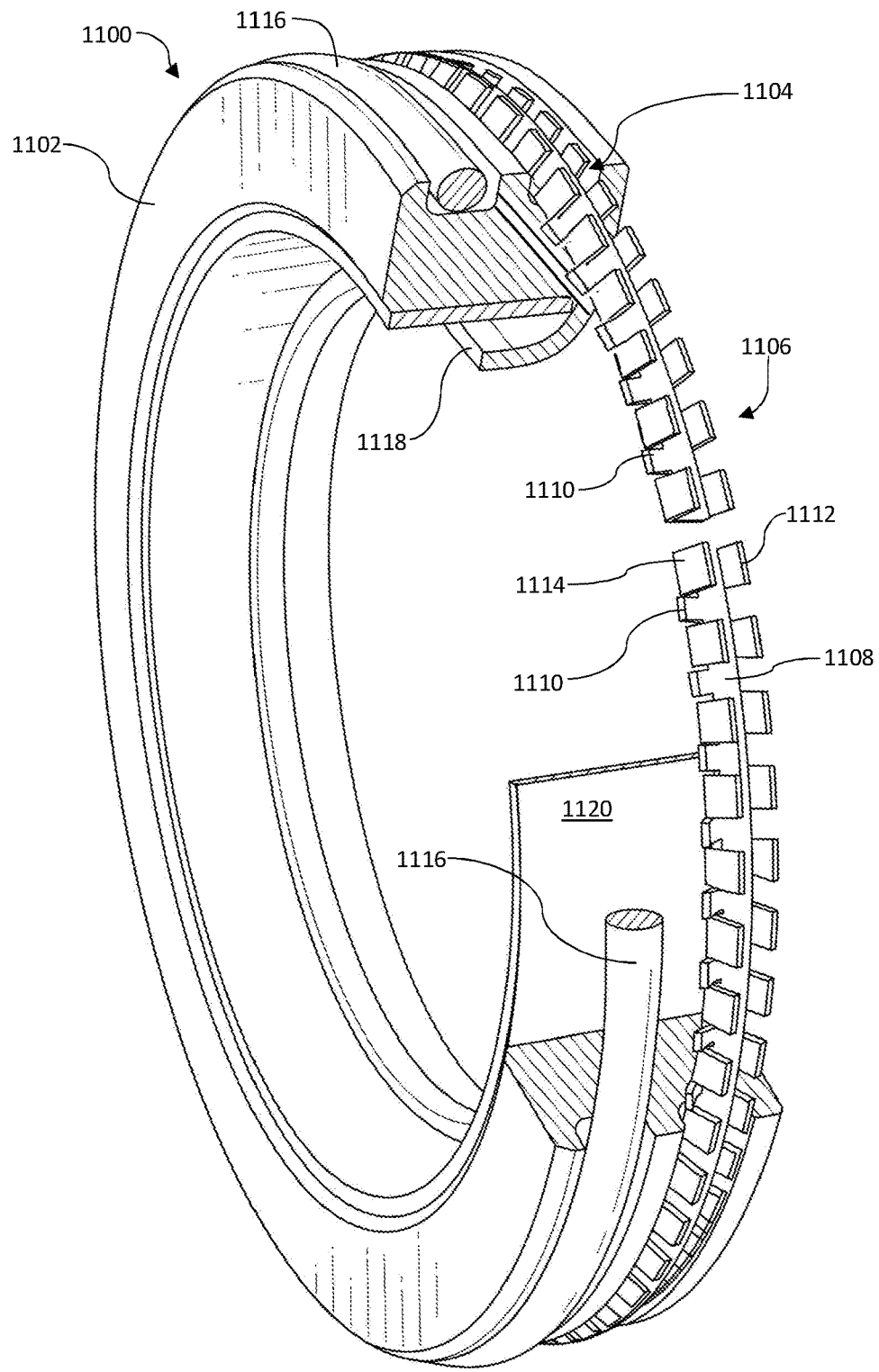
FIG. 15 is a perspective cut-away view of a first component.
Figure 16:
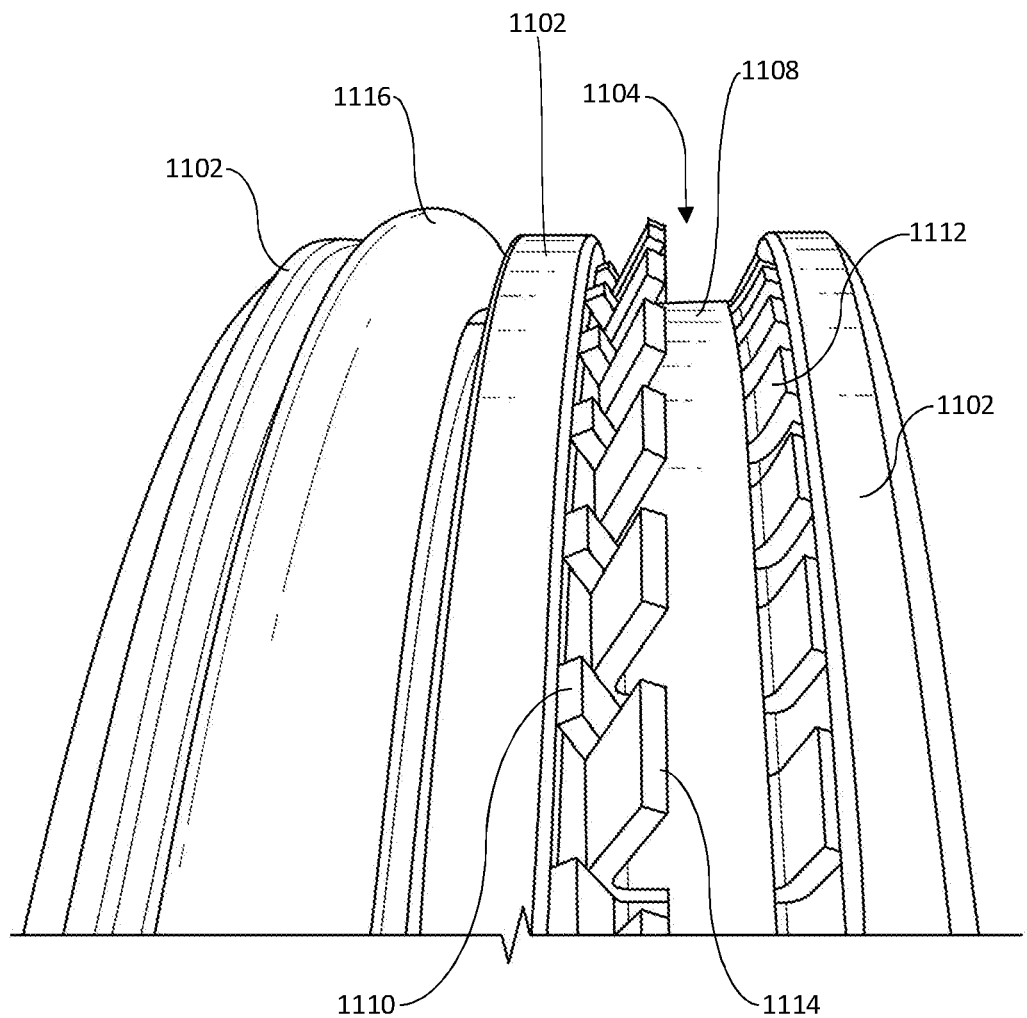
FIG. 16 is a detailed side elevation view of a first component.

FIGS. 15-16 illustrate a partial cut-away view of a first component 1100 and a partial, detailed side elevation view of a first component 1100, respectively. The first component 1100 comprises a body 1102, a groove 1104 in the body 1102 for receiving a retaining member 1106. The retaining member 1106 may further comprise a base 1108, a first set of locking fingers 1110 and a second set of locking fingers 1112 for engaging the sidewalls of the groove 1104. However, while the example illustrates a first set of locking fingers 1110 and a second set of locking fingers 1112, both sets are not required and the retaining member may only have one set of locking fingers. The retaining member 1106 further comprises tabs 1114 for engaging a second component, at least a portion of the tabs 1114 extending outside of the groove 1104. The first component 1100 may further comprise a static seal 1116, a seal lip 1118, and a support member 1120.

Figure 17:
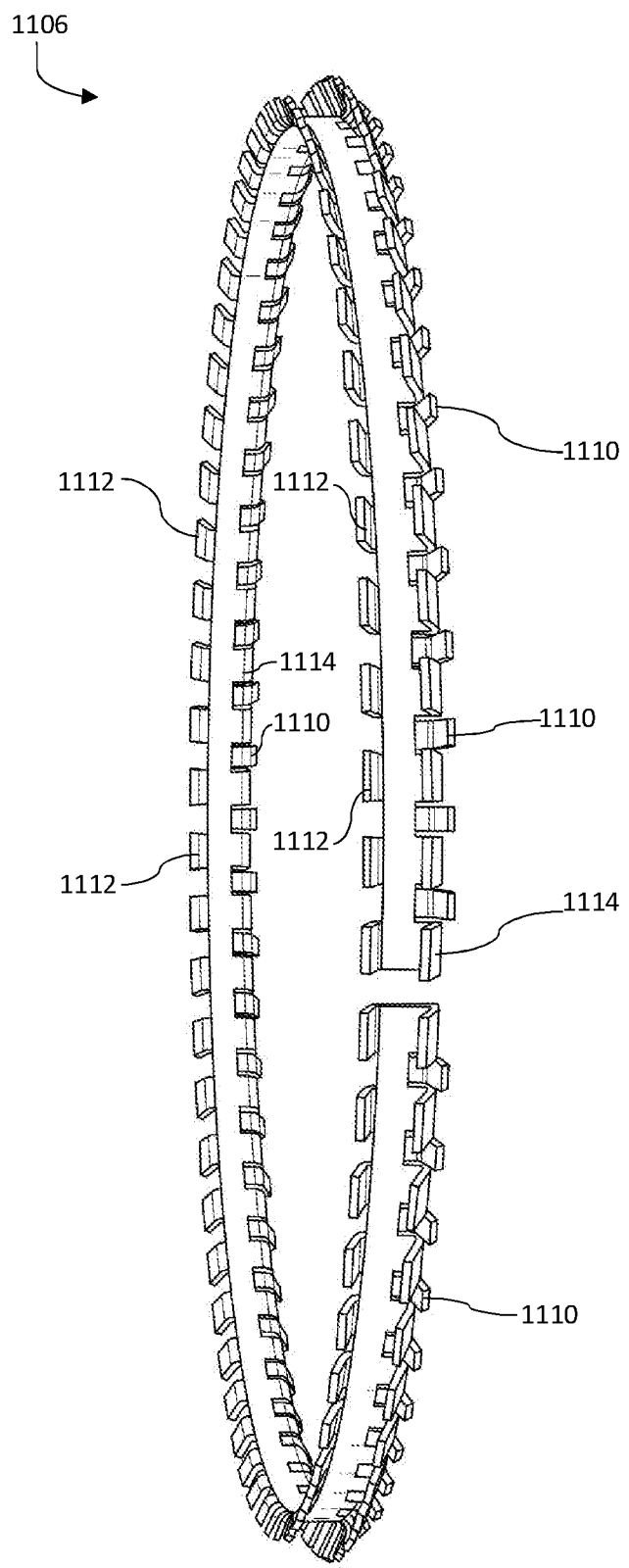
FIG. 17 is a detailed perspective view of a retaining member.

FIG. 17 illustrates a perspective view of the retaining member 1106 in a reverse orientation from that of FIG. 16. As shown, the retaining member 1106 may not be a continuous ring. In one embodiment, the retaining member 1106 is at least seventy percent of the circumference of the body 1102. In one embodiment, the retaining member 1106 is formed from linear strip material by cutting it to size and then bending and securing its two ends to one another, which can conform to a ring or other continuous shape. Depending upon the configuration of the body 1102, the retaining member 1106 may need to be coupled to the body 1102 prior to the securing of its ends one to another, such as by welding.

Figure 18:
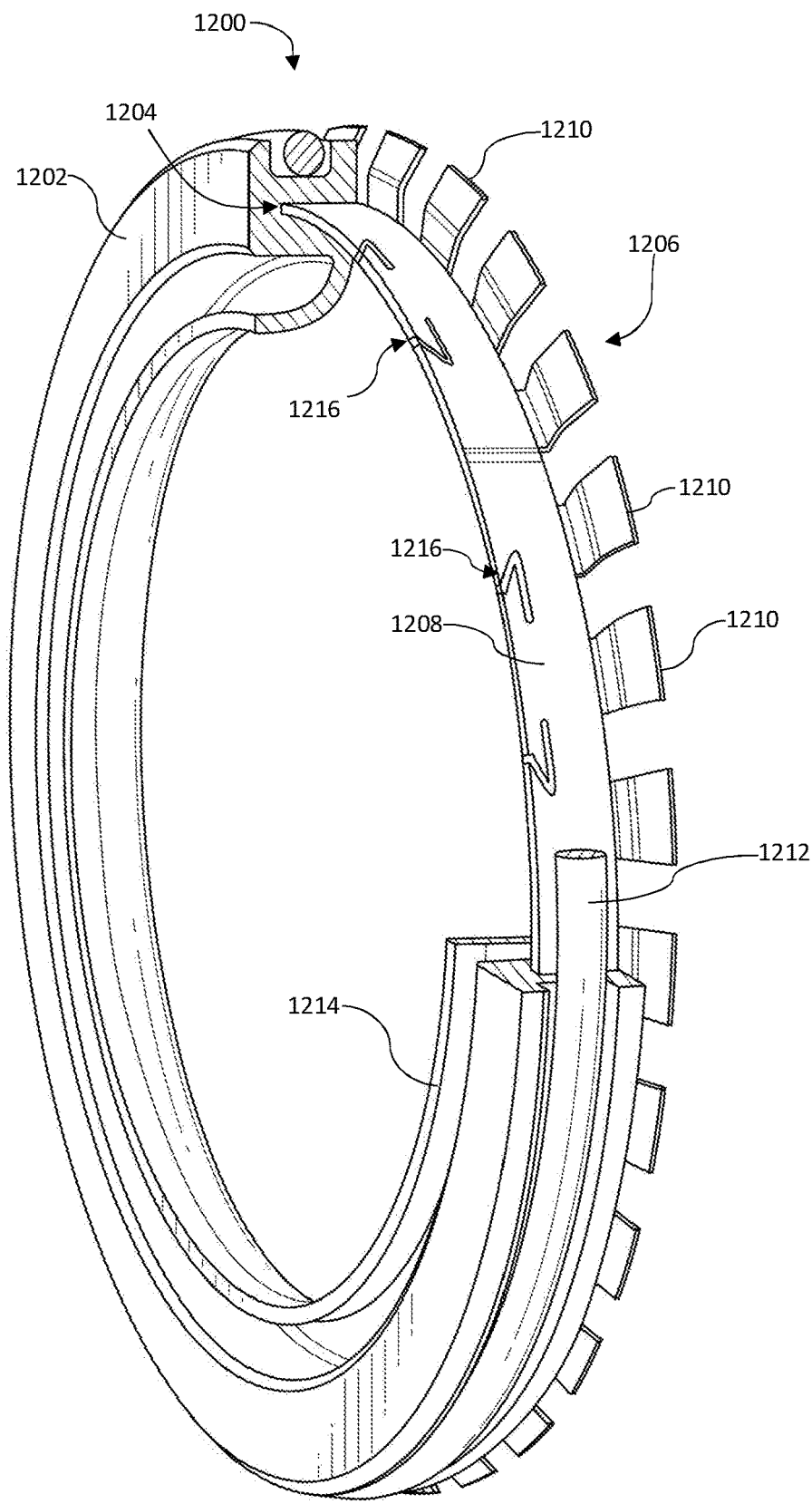
FIG. 18 is a perspective cut-away view of a first component.
Figure 19:
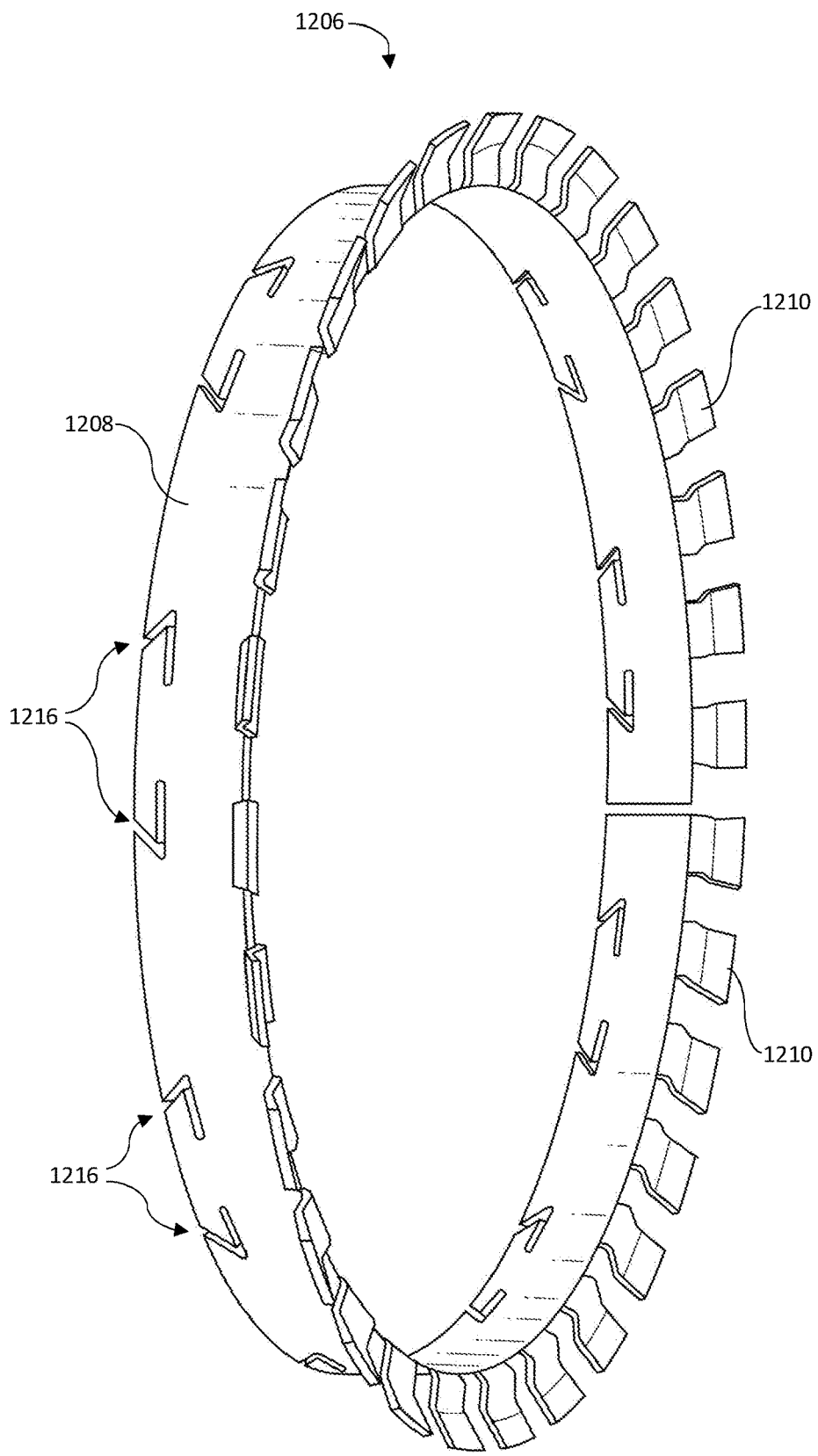
FIG. 19 is a perspective view of a combination support member and retaining member.

FIGS. 18-19 illustrate a partial cutaway perspective view of a first component 1200 and a perspective view of a retaining member 1206, respectively. The first component 1200 comprises a body 1202 and a groove 1204 for receiving a retaining member 1206. Unlike prior embodiments, where the retaining member and support member were separate parts, in this embodiment, the retaining member 1206 comprises a support member portion 1208 (i.e., the support member and the retaining member are combined into one part). In other words, the support member portion 1208 provides the same structural integrity that the support members described in earlier embodiments provide. The support member portion 1208 may be embedded in a sidewall of the body 1202 of the first component 1200, or may be inserted in the inner perimeter, such as interposed between the seal lip 1214 and the body 1202, depending upon the desired configuration. A plurality of tabs 1210 extend beyond the body 1202 to engage a second component. Unlike previous embodiments, the tabs 1210 do not emerge from a groove, but rather run adjacent to the body 1202. Like other embodiments, this first component 1200 may further comprise a static seal 1212 and a seal lip 1214, although neither is required. The support member portion 1208 may have one or more cutouts or slits 1216 that aid in assembly flexibility and that also create edges or corners to prevent rotational or axial movement within the groove 1204. As in other embodiments, and as shown, the form factor of the ring need not be continuous. In one embodiment, the retaining member 1206 is at least seventy percent of the circumference of the body 1202. In one embodiment, the ends of the retaining member 1206 are secured to one another, such as via spot weld, buckle, or overlapping (coiling) the retaining member 1206. Because the retaining member 1206 is not formed as a continuous ring, a user is able to quickly and easily adapt the size of the retaining member 1206 to the size needed for the project at hand. This is very beneficial over the prior art because in the prior art the rings are produced in predetermined sizes, requiring a user to have several sizes and varieties of rings in stock, which is costly. Further, if the ring size needed is not available, it is currently a costly and time-consuming process to have the correct size of ring produced. To the contrary, the retaining member disclosed herein may be adjusted at the time of assembly to fit the desired first component without complex equipment, extended timeframes, and added expense. Accordingly, the retaining member disclosed herein improves the art significantly.

While the examples shown and described herein generally show a dynamic seal ("first component") having a single seal lip configured on the inside of the first component, it will be appreciated by those in the art of seals that other configurations would not materially depart herefrom, such as more than one seal lip. Other contemplated configurations would include the seal lip being on the exterior of the first component, the dynamic seal being stationary on the shaft with a cylinder bore engaging the outer seal lip. Other well-known seal configurations in the art are contemplated herein.

As appreciated from the foregoing, the retaining member and retaining assemblies disclosed herein solve the need for a retaining ring (first component) which is simply assembled onto seals or other mechanical components, that provides for assembly of these items by minimal force, which can retain the component axially and resist rotation, and which does not need to be produced or stocked in unique sizes and shapes for each size or shape of assembled component. The retaining ring (also referred to as the "first component") disclosed herein solves these needs and others.

As used herein, the term "linear strip of material" refers to material that is cut-to-length, whether it is straight, coiled, or in some other configuration.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A seal assembly comprising a first component retained by a retaining member abutting a second component, the first component comprising:
 a deformable static seal;

a seal groove for receiving the deformable static seal with at least a portion of the deformable static seal remaining exposed so as to abut the second component;

a groove for receiving the retaining member, the groove being located on an outer circumferential periphery of the first component, the retaining member comprising a first portion for abutting the first component and a second portion for abutting the second component, at least the second portion comprising a plurality of tabs that extend radially outward from the groove, the plurality of tabs extending in a first direction and abutting the second component, the plurality of tabs extending in the first direction allowing movement of the first component in a first axial direction and preventing withdrawal of the first component from the second component in a second axial direction opposite to the first axial direction;

a rigid support member receivable within a channel, the rigid support member providing additional hoop strength to the first component; and a seal lip for engaging a third component.

2. The first component of the seal assembly of claim 1, wherein the rigid support member is a linear strip of material formed to fit in the channel of the first component, the channel interposed between the seal lip and the retaining member.

3. A method of assembling the first component of the seal assembly of claim 1, the method comprising:

forming the retaining member by cutting a length of a strip of material;

coupling, the retaining, member to the first component so that the tabs extend around an outer circumference of the first component;

forming the rigid support member by cutting a length of a strip of material;

coupling the rigid support member to the first component to provide hoop strength to the first component;

inserting the first component into the second component with the deformable static seal and the retaining member both interposed between, and abutting, the first component and the second component; and inserting a third component into the first component, the third component abutting the seal lip.

4. The method of claim 3, further comprising securing opposing ends of the retaining member to one another.

5. The method of claim 3, wherein the rigid support member is formed into a spiral ring.

6. The method of claim 5, further comprising securing one end of the spiral ring to the spiral ring.

7. A seal assembly comprising a first component retained by a retaining member abutting a second component, the first component comprising:

the retaining member seated in a first groove;

a static, deformable seal seated in a second groove, the static, deformable seal abutting the first and second components;

a lip for abutting a third component; and a rigid support member formed from a linear strip of material to the shape of first component, the rigid support member received within an interior channel of the first component to provide hoop strength to the first component;

wherein the retaining member is formed from a linear strip of material to the shape of the first component and remaining assembled to the first component substantially entirely in the first groove, the retaining member comprising a plurality of tabs for abutting the second component, the plurality of tabs located partially within the first groove and extending out of the first groove at an incline, such that the first component is capable of moving in a first axial direction in relation to the second component, but is prevented from moving in a second, opposite, axial direction, the incline of the plurality of tabs being with respect to the first and second axial direction.

8. The first component of the seal assembly of claim 7, wherein the interior channel for receiving the rigid support member is interposed between the lip and the retaining member.

9. A method of using the first component of the retaining assembly of claim 7 to retain the second component, the method comprising: inserting the first component into the second component, the retaining member and static seal abutting the second component, the tabs of the retaining member bending in a first direction to allow assembly, the bent tabs preventing movement of the first component in the second axial direction, prohibiting disassembly.

10. The first component of the seal assembly of claim 7, wherein the retaining member remains assembled to the first component via an interference fit.

* * * * *